(12) United States Patent
Yonezawa et al.

(10) Patent No.: US 8,378,647 B2
(45) Date of Patent: Feb. 19, 2013

(54) POWER SUPPLY UNIT AND INFORMATION PROCESSOR

(75) Inventors: Yu Yonezawa, Kawasaki (JP);
Yoshiyasu Nakashima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 19 days.

(21) Appl. No.: 13/137,939

(22) Filed: Sep. 21, 2011

(65) Prior Publication Data

US 2012/0163052 A1 Jun. 28, 2012

(30) Foreign Application Priority Data

Dec. 24, 2010 (JP) ................................ 2010-288360

(51) Int. Cl.
*G05F 1/10* (2006.01)
*G05F 1/40* (2006.01)
*H02H 7/10* (2006.01)

(52) U.S. Cl. .......... 323/222; 323/266; 323/285; 363/50; 363/82

(58) Field of Classification Search .............. 363/50–54, 363/81, 82, 126; 323/222, 266, 282–288, 323/351
See application file for complete search history.

(56) References Cited

U.S. PATENT DOCUMENTS

| | | | | |
|---|---|---|---|---|
| 4,977,493 A | * | 12/1990 | Smith | 363/126 |
| 6,115,273 A | * | 9/2000 | Geissler | 363/89 |
| 6,690,143 B2 | * | 2/2004 | Lin et al. | 323/222 |
| 6,756,771 B1 | * | 6/2004 | Ball et al. | 323/222 |
| 6,906,503 B2 | * | 6/2005 | Lopez-Santillana et al. | 323/283 |
| 7,012,413 B1 | * | 3/2006 | Ye | 323/284 |
| 7,358,706 B2 | * | 4/2008 | Lys | 323/222 |
| 7,456,621 B2 | * | 11/2008 | Leung et al. | 323/283 |
| 8,203,322 B2 | * | 6/2012 | Okubo et al. | 323/285 |

FOREIGN PATENT DOCUMENTS

| | | |
|---|---|---|
| JP | 11-018420 | 1/1999 |
| JP | 2605387 | 5/2000 |

* cited by examiner

*Primary Examiner* — Jessica Han
(74) *Attorney, Agent, or Firm* — Staas & Halsey LLP

(57) ABSTRACT

A power supply unit includes multiple input terminals to which alternating-current power is input; a positive terminal and a negative terminal for outputting direct-current power; a rectifier circuit configured to rectify the input alternating-current power; a first inductor connected to the rectifier circuit; a first capacitor connected between the positive terminal and the negative terminal; a first rectifying device connected between the output terminal of the first inductor and the positive terminal and having a rectification direction in a direction from the output terminal of the first inductor toward the positive terminal; a switching device connected between an input terminal of the first rectifying device and the negative terminal; a second rectifying device and a second capacitor connected in parallel to the switching device; and a second inductor connected between a connection of the second rectifying device and the second capacitor and the positive terminal.

9 Claims, 16 Drawing Sheets

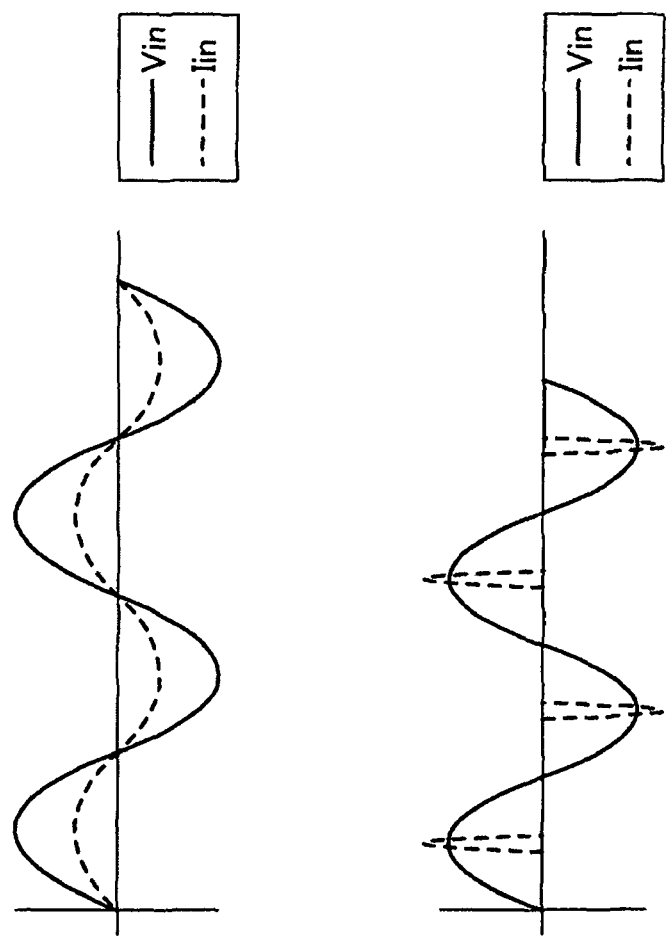
FIG.2A REALTED ART
FIG.2B REALTED ART

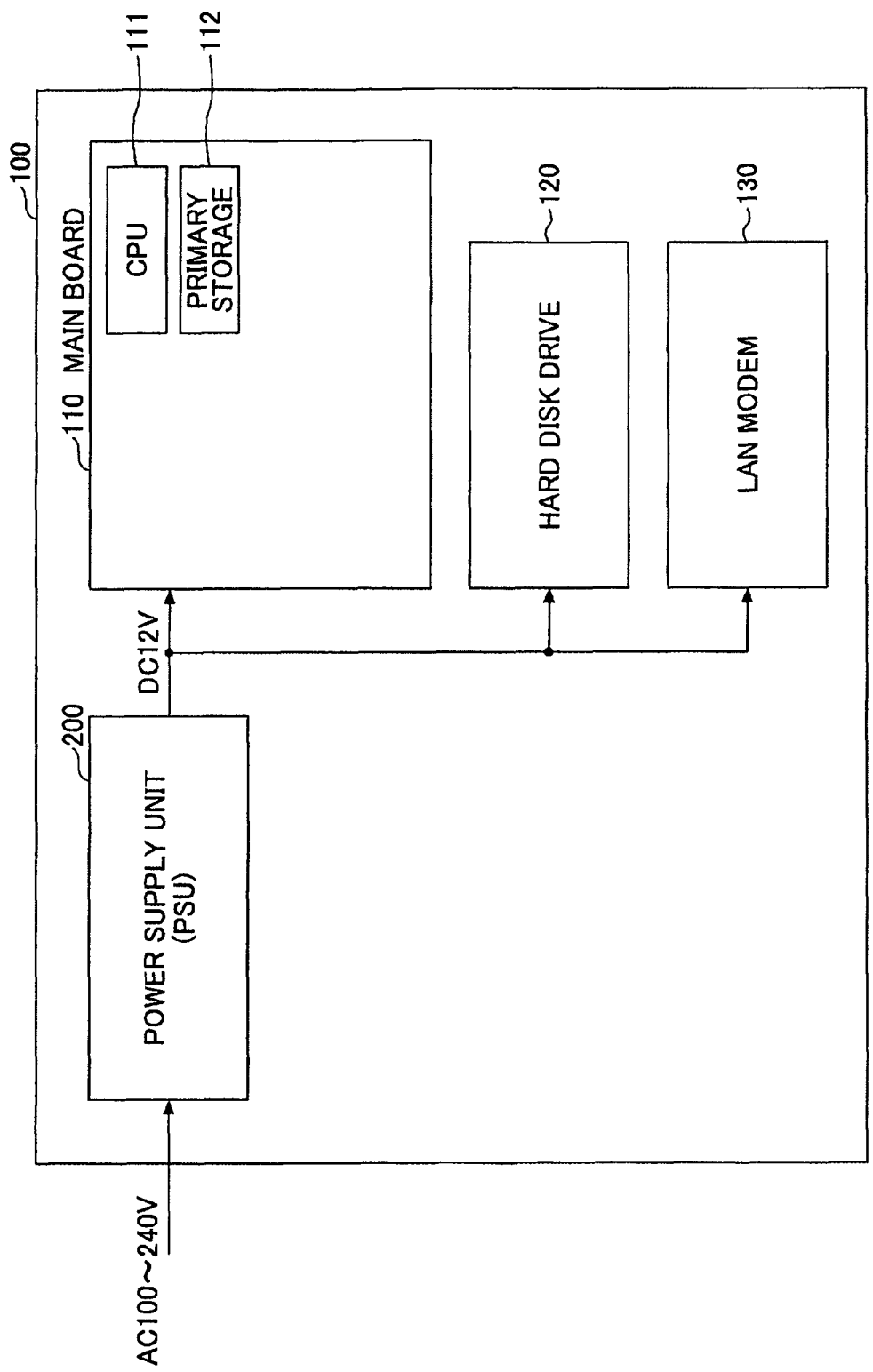

US 8,378,647 B2

POWER SUPPLY UNIT AND INFORMATION PROCESSOR

CROSS-REFERENCE TO RELATED APPLICATION

This application is based upon and claims the benefit of priority of the prior Japanese Patent Application No. 2010-288360, filed on Dec. 24, 2010, the entire contents of which are incorporated herein by reference.

FIELD

A certain aspect of the embodiments discussed herein is related to a power supply unit and an information processor.

BACKGROUND

There is a conventional power supply unit that includes alternating-current (AC) power supply terminals to be connected to an AC power supply, a step-up inductor, a diode-bridge rectifier circuit, a switching device, a snubber circuit, and a smoothing capacitor, where the AC power supplied from the AC power supply has its voltage raised with the inductor and is converted into direct-current (DC) power in the rectifier circuit to be supplied to a load circuit.

By causing resonance current to flow through a closed circuit including multiple capacitors, multiple resonating reactors, and multiple diodes in the snubber circuit, the electric energy stored in the capacitors is regenerated to the smoothing capacitor.

Further in a power supply unit having a circuit configuration where the step-up inductor and the diode-bridge rectifier circuit are counterchanged, the AC power supplied from the AC power supply is converted into DC power in the rectifier circuit and has its voltage raised in the inductor to be supplied to a load circuit.

In this power supply unit, an inductor and a switching device are provided in the snubber circuit, and the electric energy stored in a capacitor is regenerated to the smoothing capacitor by turning ON/OFF the switching device in the snubber circuit.

For related art, reference may be made to, for example, Japanese Laid-open Patent Publication No. 11-018420 and Japanese Registered Utility Model No. 2605387.

SUMMARY

According to an aspect of the invention, a power supply unit includes a plurality of input terminals to which alternating-current power is input; a positive terminal and a negative terminal for outputting direct-current power; a rectifier circuit configured to rectify the input alternating-current power; a first inductor connected to the rectifier circuit; a first capacitor connected between the positive terminal and the negative terminal; a first rectifying device connected between an output terminal of the first inductor and the positive terminal and having a rectification direction in a direction from the output terminal of the first inductor toward the positive terminal; a switching device connected between an input terminal of the first rectifying device and the negative terminal; a second rectifying device and a second capacitor connected in parallel to the switching device; and a second inductor connected between a connection of the second rectifying device and the second capacitor and the positive terminal.

The object and advantages of the embodiments will be realized and attained by means of the elements and combinations particularly pointed out in the claims.

It is to be understood that both the foregoing general description and the following detailed description are exemplary and explanatory and not restrictive of the invention, as claimed.

BRIEF DESCRIPTION OF THE DRAWINGS

FIGS. 2A and 2B are waveform charts illustrating waveforms of an input voltage and an input current of a rectifier circuit of the power supply unit of Comparative Example 1 and waveforms of an input voltage and an input current of the rectifier circuit of the power supply unit of Comparative Example 2, respectively;

FIG. 6 is a block diagram illustrating an information processor including a power supply unit according to a first embodiment;

FIGS. 12A, 128, and 12C are a plan view, a cross-sectional view taken along the line A-A' of FIG. 12A, and a bottom view, respectively, of part of the power supply unit according to a second embodiment, FIG. 12B illustrates a cross section viewed in the direction of arrows A and A' in FIG. 12A, and FIG. 12D is a cross-sectional view of part of the power supply unit according to a variation of the second embodiment.

DESCRIPTION OF EMBODIMENTS

In the conventional power supply unit where the snubber circuit has a closed circuit including capacitors, resonating reactors, and diodes, the snubber circuit includes a large number of circuit elements. Therefore, there is the problem of a great loss in regenerating electric energy.

Further, the capacitors are charged through multiple diodes separate from the diodes included in the closed circuit. This reduces the efficiency of regeneration of electric energy.

Further, in the conventional power supply unit where the snubber circuit includes a switching device, there is the problem of an increase in loss and generation of noise due to switching.

According to an aspect of the invention, a power supply unit and an information processor are provided that enable control of surge voltage.

Preferred embodiments of the present invention will be explained with reference to accompanying drawings.

Before giving a description of a power supply unit and an information processor according to embodiments, first, a description is given, with reference to FIGS. 1A and 1B through FIG. 5, of problems of power supply units of comparative examples.

Figure 1A:
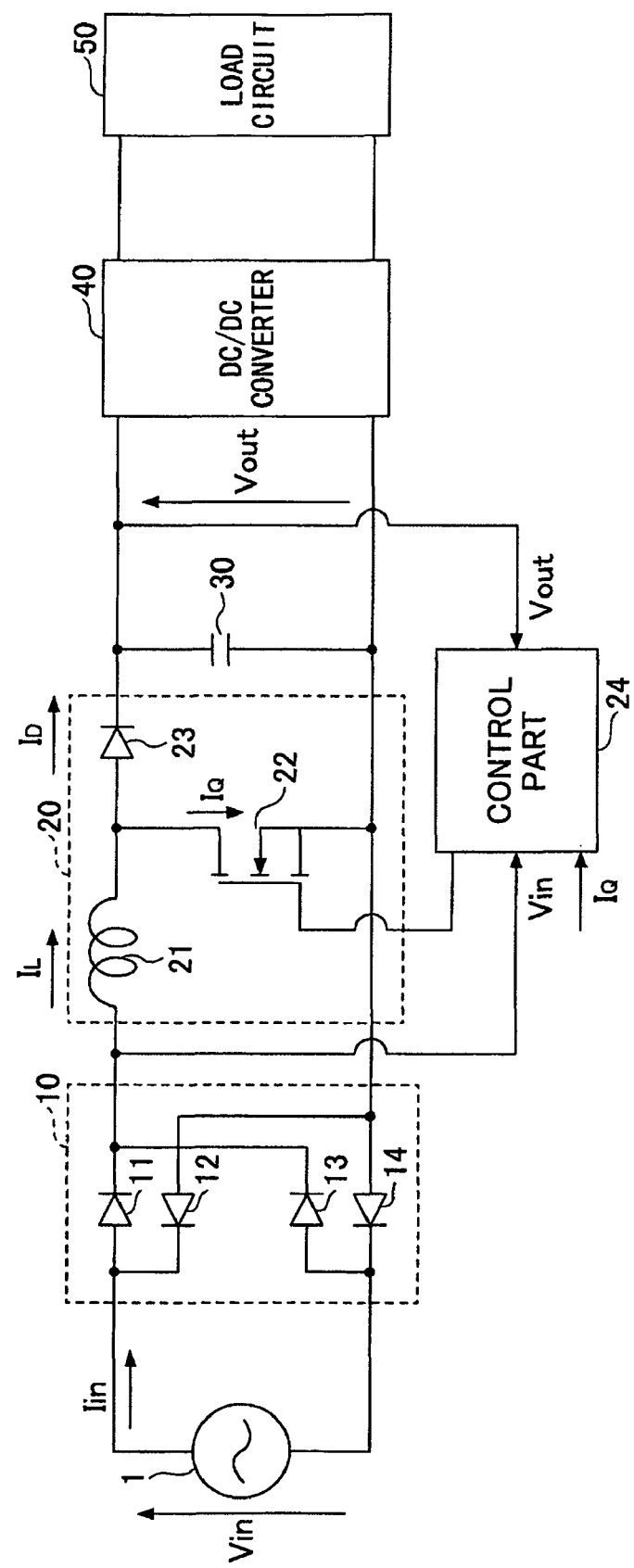
FIGS. 1A and 1B are circuit diagrams illustrating a power supply unit of Comparative Example 1 and a power supply unit of Comparative Example 2, respectively.
Figure 1B:
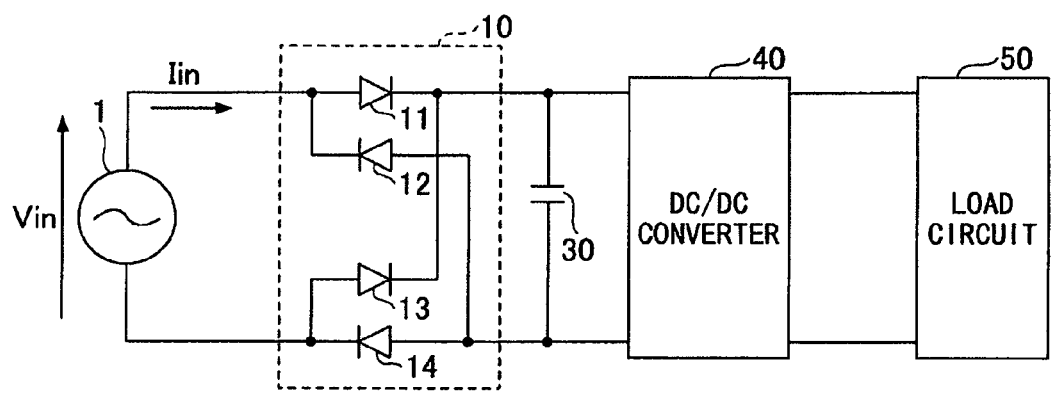

FIG. 1A and FIG. 1B are circuit diagrams illustrating power supply units of Comparative Examples 1 and 2.

The power supply unit of Comparative Example 1 illustrated in FIG. 1A includes a rectifier circuit 10, a power factor correction (PFC) circuit 20, a smoothing capacitor 30, and a direct current-to-direct current (DC-DC) converter 40.

The rectifier circuit 10 is a diode bridge having four diodes 11, 12, 13, and 14 connected in a bridge circuit configuration. The rectifier circuit 10 is connected to an alternating-current (AC) power supply 1. The rectifier circuit 10 performs full-wave rectification on AC power and outputs the AC power.

Here, since the output voltage of the AC power supply 1 is Vin, the input voltage of the rectifier circuit 10 is Vin. The rectifier circuit 10 performs full-wave rectification on the AC power input from the AC power supply 1, and outputs the AC power subjected to the full-wave rectification.

AC power of, for example, a voltage of 80 V to 265 V is input to the rectifier circuit 10. Therefore, voltage drops in the diodes 11, 12, 13, and 14 of the rectifier circuit 10 may be ignored.

Therefore, the input voltage of the rectifier circuit 10 is Vin, and a description is given based on the assumption that the output voltage of the rectifier circuit 10 is Vin.

The PFC circuit 20 includes an inductor 21, a switching device 22, and a diode 23, which are connected in T form, and a control part 24. The PFC circuit 20 is an active filter circuit that reduces distortions such as harmonics included in current rectified in the rectifier circuit 10 to improve the power factor of electric power.

The inductor 21 may be, for example, a step-up inductor.

The switching device 22 may be, for example, a metal-oxide semiconductor field-effect transistor (MOSFET). The switching device 22 is turned ON and OFF in response to application of pulsating gate voltage to the gate of the switching device 22 from the control part 24, so that the switching device 22 is driven by a pulse-width modulation (PWM) signal (PWM-driven).

The diode 23 may have a rectification direction in the direction from the inductor 21 to the smoothing capacitor 30. For example, a fast-recovery diode or a SiC Schottky diode may be used as the diode 23.

The control part 24 outputs the pulsating gate voltage that is applied to the gate of the switching device 22. The control part 24 determines the duty ratio of the gate voltage based on the voltage value Vin of the full-wave-rectified power output from the rectifier circuit 10, the current value $I_Q$ of current flowing through the switching device 22, and the voltage value Vout of the output side of the smoothing capacitor 30, and applies the gate voltage to the gate of the switching device 22. For example, a multiplier circuit capable of calculating the duty ratio based on the current value $I_Q$ and the voltage values Vout and Vin may be used as the control part 24.

The smoothing capacitor 30 smoothes the output voltage of the PFC circuit 20 and inputs the smoothed voltage to the DC-DC converter 40. DC power of, for example, a voltage of 385 V is input to the DC-DC converter 40.

The DC-DC converter 40 is a converter circuit that converts a DC power voltage value and outputs the converted voltage value. The load circuit 50 is connected to the DC-DC converter 40 on its output side. For example, if an information processor including the power supply unit illustrated in FIG. 1A is a personal computer (PC) or a server, the load circuit 50 may be a central processing unit (CPU), a primary storage, a secondary storage, etc.

Here, for example, the DC-DC converter 40 converts DC power of a voltage of 385 V into DC power of a voltage of 12 V, and outputs the 12 V DC power to the load circuit 50.

The power supply unit of Comparative Example 2 illustrated in FIG. 1B has a circuit configuration formed by removing the PFC circuit 20 from the power supply unit of Comparative Example 1 illustrated in FIG. 1A. The smoothing capacitor 30 is directly connected to the rectifier circuit 10 on its output side.

Next, a description is given, with reference to FIGS. 2A and 2B, of the waveforms of the input voltage Vin and the input current Iin of the rectifier circuits 10 of the power supply units of Comparative Examples 1 and 2.

FIG. 2A is a waveform chart illustrating the waveforms of the input voltage Vin and the input current Iin of the rectifier circuit 10 of the power supply unit of Comparative Example 1. FIG. 2B is a waveform chart illustrating the waveforms of the input voltage Vin and the input current Iin of the rectifier circuit 10 of the power supply unit of Comparative Example 2. In FIGS. 2A and 2B, the input voltage Vin is indicated by a solid line, and the input current Iin is indicated by a broken line.

As indicated by a solid line in FIGS. 2A and 2B, a sinusoidal AC voltage is input to the rectifier circuits 10 of Comparative Examples 1 and 2 as the input voltage Vin.

On the other hand, the input current Iin is a sinusoidal AC current as illustrated in FIG. 2A in the power supply unit of Comparative Example 1 including the PFC circuit 20, and is a harmonic current as illustrated in FIG. 2B in the power supply unit of Comparative Example 2 that does not include the PFC circuit 20.

The input current Iin of the power supply unit of Comparative Example 2 is a harmonic current because in the power supply unit of Comparative Example 2 illustrated in FIG. 1B, the input current Iin flows only when the input voltage Vin exceeds the voltage across the smoothing capacitor 30.

On the other hand, in the power supply unit of Comparative Example 1 including the PFC circuit 20, the switching device 22 in the PFC circuit 20 is turned ON and OFF in accordance with the value of the voltage between the input terminals of the load circuit 50, thereby causing the input current Iin to be a sinusoidal current as illustrated in FIG. 2A.

Figure 3:
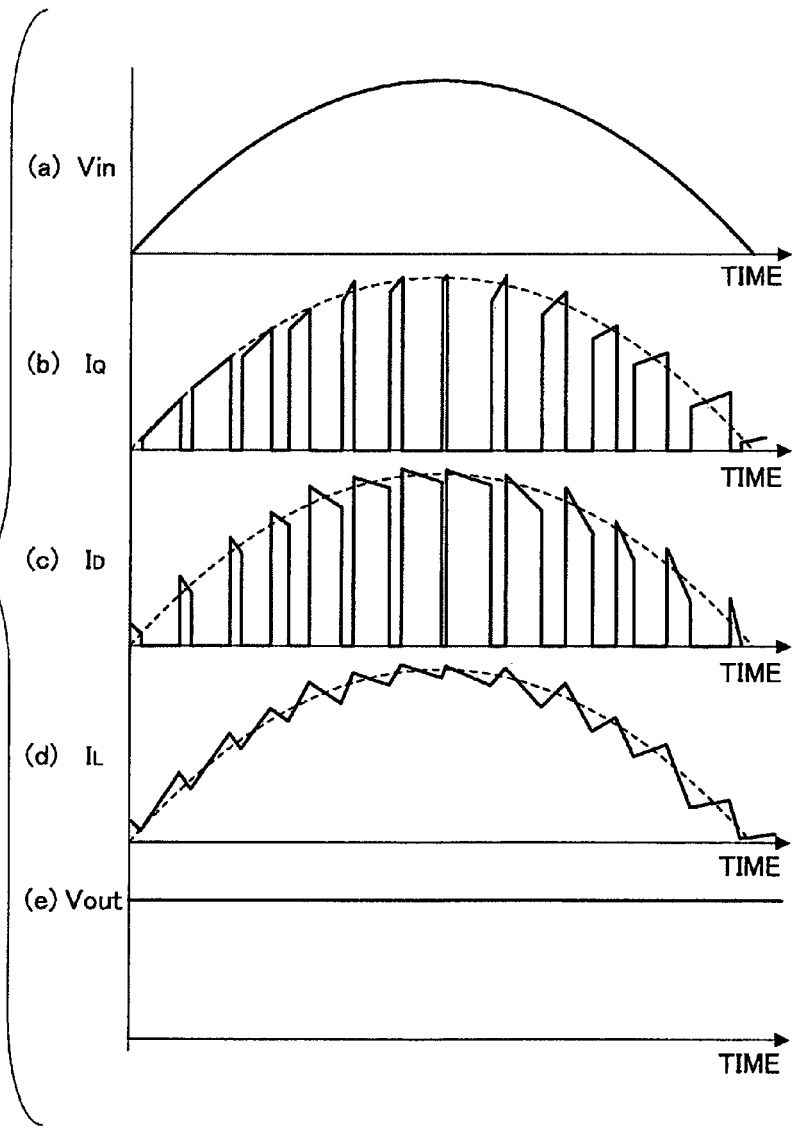
FIG. 3 is a waveform chart of signals, illustrating voltages and currents in the power supply unit of Comparative Example 1, where (a) illustrates a waveform of the input voltage, (b) illustrates a waveform of a current of a switching device, (c) illustrates a waveform of a current of a diode, (d) illustrates a waveform of a current of an inductor, and (e) illustrates a waveform of an output voltage.

Here, a description is given, with reference to FIG. 3, of an operation of the PFC circuit 20, letting a current flowing from the inductor 21 to the diode 23, a current flowing from the inductor 21 to the switching device 22, and a current flowing through the inductor 21 be $I_D$, $I_Q$, and $I_L$, respectively, as illustrated in FIG. 1A.

FIG. 3 is a waveform chart of signals, illustrating voltages and currents in the power supply unit of Comparative Example 1, where (a) illustrates a waveform of the input voltage Vin, (b) illustrates a waveform of the current $I_Q$ of the switching device 22, (c) illustrates a waveform of the current $I_D$ of the diode 23, (d) illustrates a waveform of the current $I_L$ of the inductor 21, and (e) illustrates a waveform of the output voltage Vout.

The output voltage Vout of the power supply unit of Comparative Example 1 is the voltage that is output as the voltage across the smoothing capacitor 30 and input to the DC-DC converter 40.

As illustrated in (a) of FIG. 3, the input voltage Vin, input to the power supply unit of Comparative Example 1 from the AC power supply 1 (FIG. 1A), is a sinusoidal AC voltage. When the input voltage Vin is applied to the rectifier circuit 10 of the power supply unit of Comparative Example 1, the output voltage of the rectifier circuit 10 has a waveform of the AC voltage subjected to full-wave rectification.

Accordingly, as illustrated in (b) of FIG. 3, the current $I_Q$ of the switching device 22, which flows during the ON period of the switching device 22 and does not flow during the OFF period of the switching device 22, has a waveform like a pulse signal, and the pulses has an outline of a half-cycle sine wave. Each of the pulses of the current $I_Q$ of the switching device 22 increases in amplitude with time because the current $I_Q$ increases as the magnetic energy of the inductor 21 increases with passage of time during the ON period of the switching device 22.

Further, as illustrated in (c) of FIG. 3, the current $I_D$ of the diode 23, which flows during the OFF period of the switching device 22 and does not flow during the ON period of the switching device 22, has a waveform like a pulse signal, and the pulses has an outline of a half-cycle sine wave. Each of the pulses of the current $I_Q$ of the switching device 22 decreases in amplitude with time because the current $I_D$ decreases as the magnetic energy of the inductor 21 decreases with passage of time during the OFF period of the switching device 22.

Thus, the current $I_L$ of the inductor 21, which is a combination of the current $I_Q$ of the switching device 22 illustrated in (b) of FIG. 3 and the current $I_D$ of the diode 23 illustrated in (c) of FIG. 3, is a current having a waveform of a substantial half-cycle sine wave as illustrated in (d) of FIG. 3.

The output voltage Vout, smoothed by the smoothing capacitor 30, is a substantially constant voltage as illustrated in (e) of FIG. 3. Here, by way of example, the output voltage Vout is 385 V.

In FIG. 3, (a) through (e) illustrate voltages and currents for a half cycle. For the other (remaining) half cycle, the input voltage Vin illustrated in (a) of FIG. 3 is reversed in polarity, and the current $I_Q$, the current $I_D$, the current $I_L$, and the output voltage Vout have the same waveforms as illustrated in (b) through (e), respectively, of FIG. 3.

Figure 4:
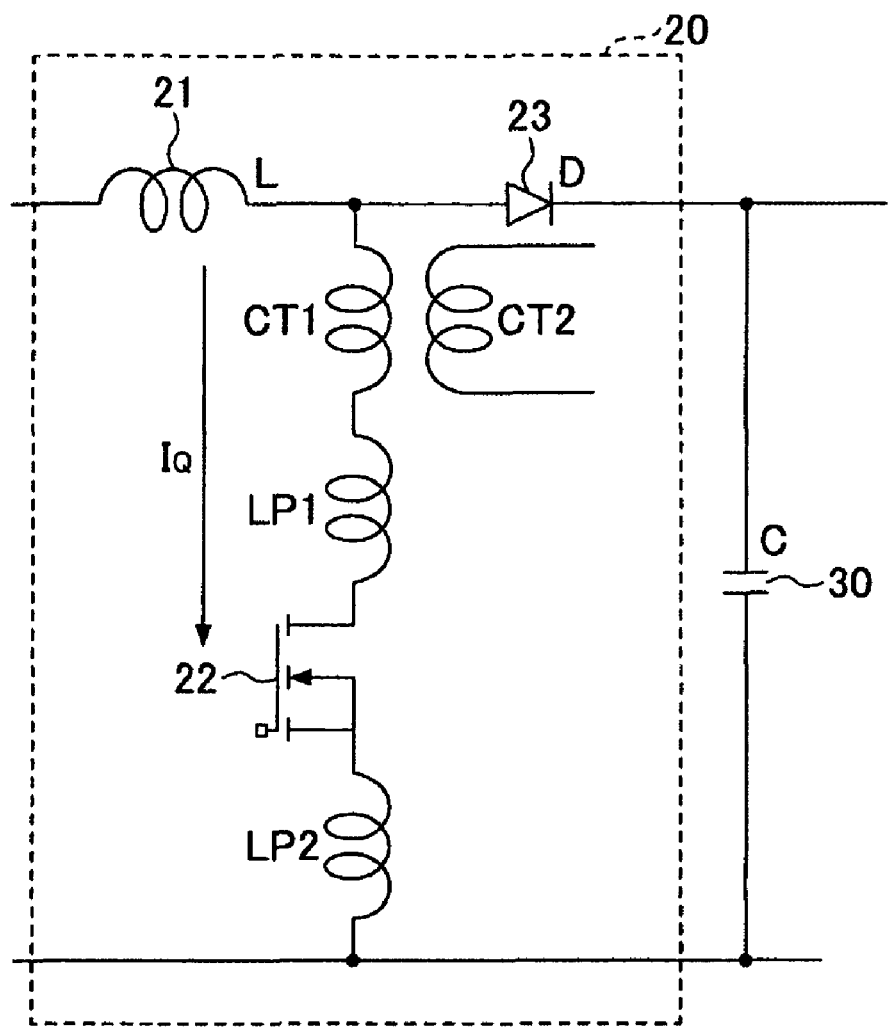
FIG. 4 is a diagram illustrating a PFC circuit and a smoothing capacitor of the power supply unit of Comparative Example 1.
Figure 5:
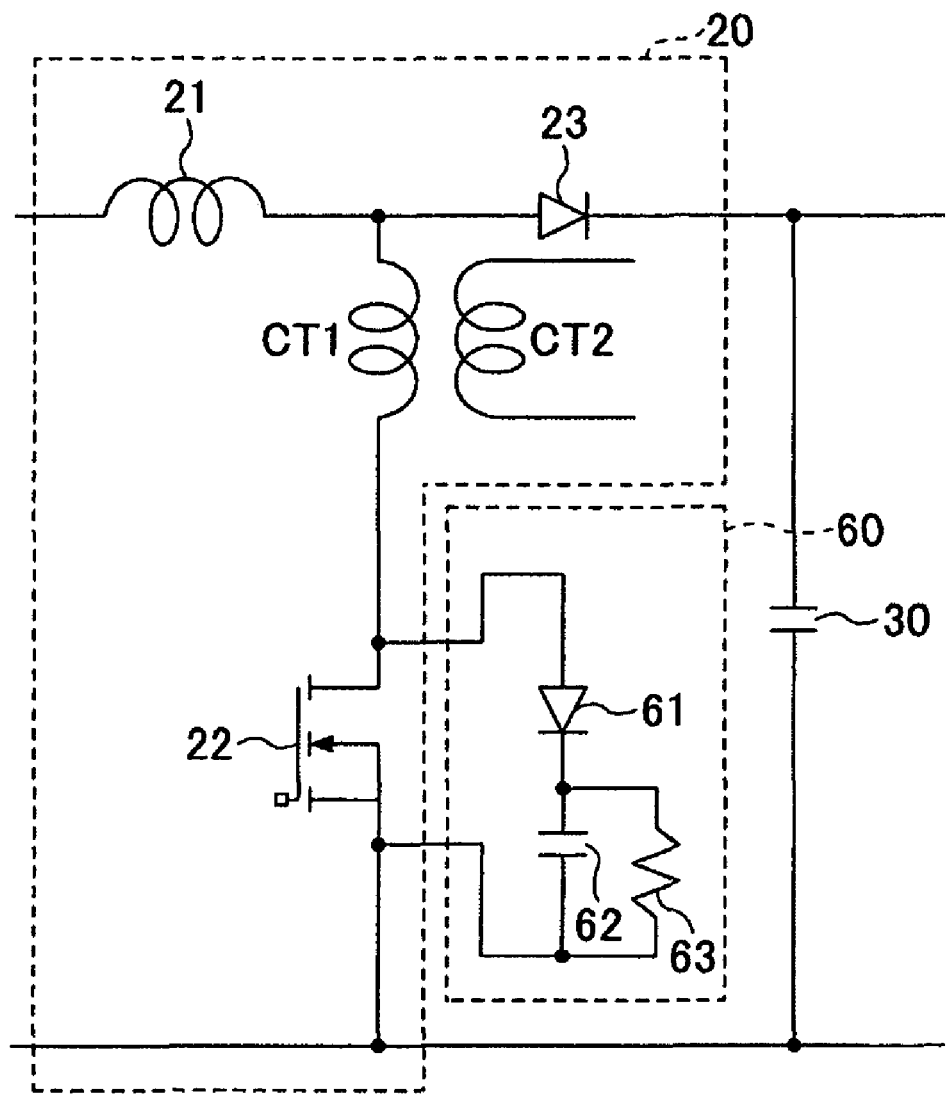
FIG. 5 is a diagram illustrating a circuit configuration where a snubber circuit is connected to the PFC circuit of the power supply unit of Comparative Example 1.

Next, a description is given, with reference to FIG. 4 and FIG. 5, of the surge voltage caused by turning ON and OFF the switching device 22 and a snubber circuit that controls the surge voltage.

FIG. 4 is a diagram illustrating the PFC circuit 20 and the smoothing capacitor 30 of the power supply unit of Comparative Example 1.

The switching device 22 has a parasitic inductor on each of its input side and output side. In FIG. 4, the input-side parasitic inductor is denoted by LP1, and the output-side parasitic inductor is denoted by LP2.

Further, a primary winding CT1 of a current transformer for measuring the current $I_Q$ is connected in series to the switching device 22. The primary winding CT1 of the current transformer is a coil and therefore has inductance.

The primary winding CT1 of the current transformer is coupled to a secondary winding CT2 for measurement. The current $I_Q$ flowing through the switching device 22 is measured based on the voltage value output by the secondary winding CT2.

As illustrated in FIG. 4, the parasitic inductors LP1 and LP2 and the primary winding CT1 of the current transformer are connected to the switching device 22. Therefore, turning ON and OFF the switching device 22 causes a surge voltage. The surge voltage increases as the switching (ON/OFF) speed of the switching device 22 increases.

Here, letting the combined inductance of the parasitic inductors LP1 and LP2 and the primary winding CT1 of the current transformer be LP, a surge voltage Vs expressed by $Vs = LP \times dI_Q/dt$ is generated at the time of turning OFF the switching device 22.

For example, letting $dI_Q$, dt, and LP be 15 A, 100 ns (nanoseconds), and 1 µH, respectively, Vs is 150 V. This value of the surge voltage is significantly large compared with the output voltage Vout (=385 V) of the power supply unit of Comparative Example 1.

Here, in order to control the surge voltage, the withstand voltage of the switching device 22 may be increased. However, an increase in the withstand voltage causes an increase in the ON-state resistance of the switching device 22 and also an increase in the size of the switching device 22. Therefore, it is not preferable to increase the withstand voltage of the switching device 22.

Therefore, a snubber circuit is used to control the surge voltage.

FIG. 5 is a diagram illustrating a circuit configuration where a snubber circuit 60 is connected to the PFC circuit 20 of the power supply unit of Comparative Example 1. In FIG. 5, the parasitic inductors LP1 and LP2 of the switching device 22 are omitted.

The snubber circuit 60 includes a diode 61, a capacitor 62, and a resistor 63. The snubber circuit 60 is connected in parallel to the switching device 22. The input terminal of the diode 61 is connected to the connection of the primary winding CT1 of the current transformer and the switching device 22. The output terminal of the diode 61 is connected to the capacitor 62 and the resistor 63. The capacitor 62 and the resistor 63 are connected in parallel to each other.

A voltage is generated in the primary winding CT1 of the current transformer when the switching device 22 is turned OFF. A current due to the voltage generated in the primary winding CT1 is absorbed into the capacitor 62 through the diode 61. Then, the electric energy collected into the capacitor 62 is consumed by the resistor 63.

Therefore, it is possible to control the surge voltage caused by turning ON and OFF the switching device 22.

The same applies to the voltage generated in the parasitic inductors LP1 and LP2 (FIG. 4) of the switching device 22 by turning ON and OFF the switching device 22. The voltage generated in the parasitic inductors LP1 and LP2 is absorbed into the capacitor 62 through the diode 61. The electric energy collected into the capacitor 62 is consumed by the resistor 63.

As described above, connecting the snubber circuit 60 in parallel to the switching device 22 of the power supply unit of Comparative Example 1 makes it possible to control the surge voltage. However, there is a problem in that the electric energy collected into the capacitor 62 is consumed by the resistor 63, thus causing a loss of energy.

The current value of the switching device 22 may also be measured using a resistor in place of the current transformer. In the case of measuring the current value of the switching device 22 using a resistor in place of the current transformer, the PFC circuit 20 does not have the primary winding CT1.

However, even in the case of measuring the current value of the switching device 22 using a resistor in place of the current transformer, the surge voltage is caused by the parasitic inductor LP1 and the parasitic inductor LP2 of the switching device 22.

Therefore, there is still a problem in that controlling the surge voltage by connecting the snubber circuit 60 in parallel to the switching device 22 causes the electric energy collected into the capacitor 62 to be consumed by the resistor 63, thus causing a loss of energy as in the case of using the current transformer.

According to one or more of the embodiments described below, a power supply unit and an information processor are provided that solve one or more of the above-described problems.

According to one or more of the embodiments described below, a power supply unit and an information processor are provided that enable control of surge voltage.

[a] First Embodiment

FIG. 6 is a block diagram illustrating an information processor including a power supply unit according to a first embodiment.

In the first embodiment, by way of example, a description is given based on the assumption that the information processor is a server 100.

The server 100 includes a power supply unit (PSU) 200 according to the first embodiment, a main board 110, a hard disk drive 120, and a modem 130 for a local area network (LAN) (LAN modem 130). In the first embodiment, for convenience of description, the main board 110, the hard disk drive 120, and the LAN modem 130 are illustrated in FIG. 6. The server 100, however, may further include components other than the main board 110, the hard disk drive 120, and the LAN modem 130.

A central processing unit (CPU) 111 and a primary storage 112 such as a random access memory (RAM) or a read-only memory (ROM) are mounted on the main board.

Inside the server 100, the power supply unit 200 supplies electric power to the CPU 111 and the primary storage 112 mounted on the main board 110, the hard disk drive 120, and the LAN modem 130. AC (electric) power of, for example, a voltage of 80 V to 265 V is input to the power supply unit 200. The power supply unit 200 converts AC power into low-voltage DC (electric) power, and outputs DC power of, for example, a voltage of 12 V.

Figure 7A:
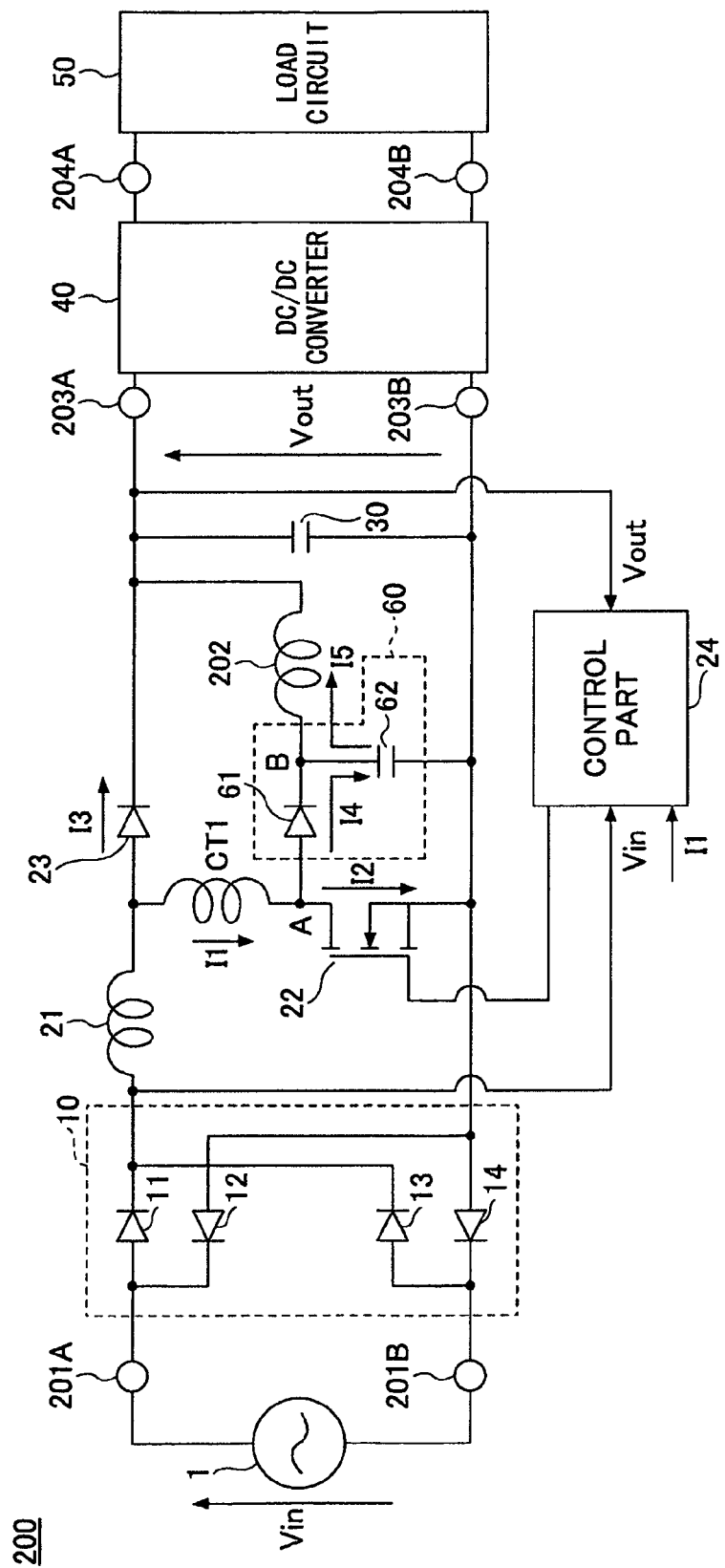
FIG. 7A is a circuit diagram illustrating the power supply unit according to the first embodiment.
Figure 7B:
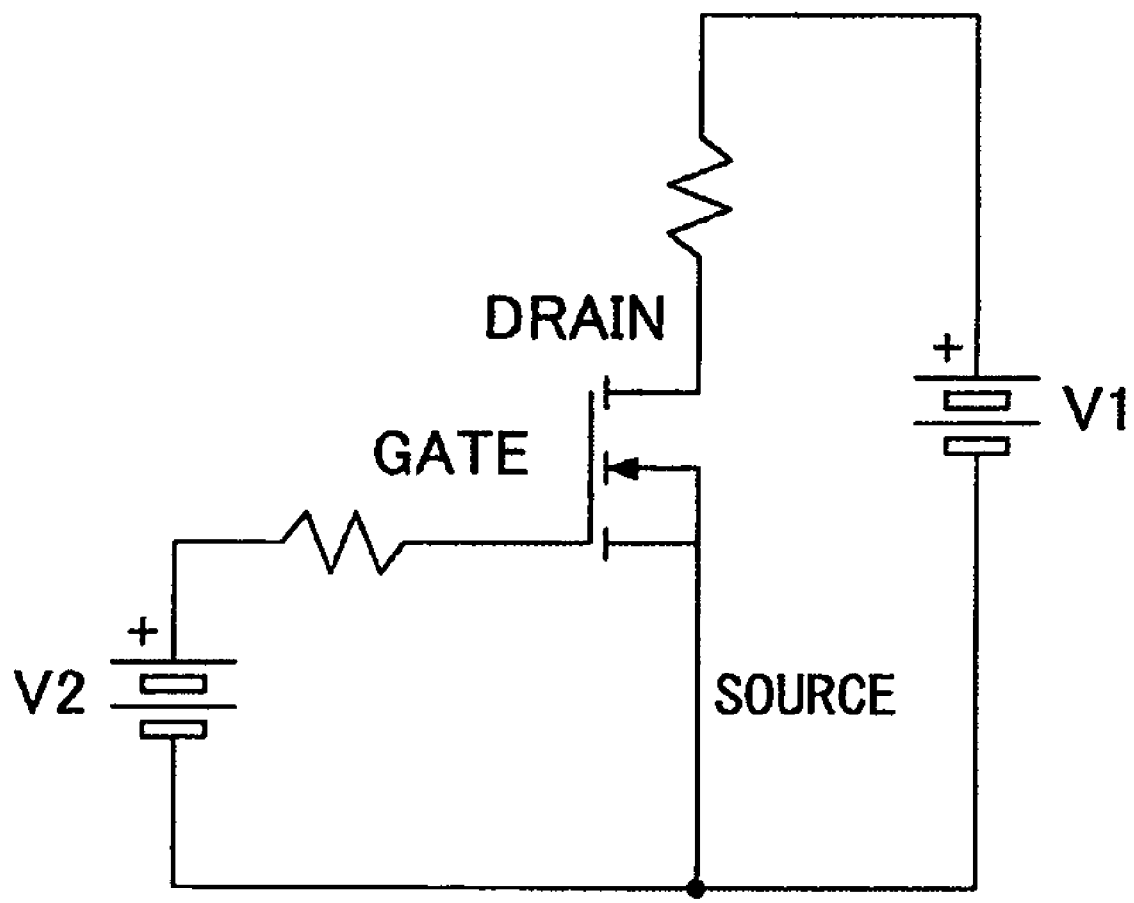
FIG. 7B is a diagram illustrating a driver circuit of a GaN-HEMT used as the switching device of the power supply unit according to the first embodiment.

Next, a description is given, with reference to FIGS. 7A and 7B, of the power supply unit 200 according to the first embodiment.

FIG. 7A is a circuit diagram illustrating the power supply unit 200 according to the first embodiment. In FIG. 7A, the same elements as or elements equivalent to those of the power supply unit of Comparative Example 1 (FIG. 1A and FIG. 5) are referred to by the same reference numerals, and a description thereof is omitted.

The power supply unit 200 includes input terminals 201A and 201B, the rectifier circuit 10, the inductor 21, the switching element 22, the diode 23, the control part 24, the primary winding CT1 of the current transformer, the snubber circuit 60, an inductor 202, the smoothing capacitor 30, output terminals 203A and 203B, the DC-DC converter 40, output terminals 204A and 204B, and the load circuit 50.

The input terminals 201A and 201B are examples of input terminals for connecting the AC power supply 1. AC power is input to the input terminals 201A and 201B of the power supply unit 200 from the AC power supply 1.

The output terminal 203A is an example of a positive terminal that outputs DC power. The output terminal 203B is an example of a negative terminal that outputs DC power.

The output terminals 204A and 204B are connected to the output terminals 203A and 203B, respectively, on their output sides through the DC-DC converter 40. The output terminals 204A and 204B output DC power. Therefore, an example of a positive terminal and an example of a negative terminal may also be the output terminals 204A and 204B, respectively. Further, the input terminal 201B and the output terminal 204B are kept at ground potential.

The smoothing capacitor 30 is an example of a first capacitor connected between the output terminal 203A and the output terminal 203B.

The rectifier circuit 10 is an example of a rectifier circuit that rectifies the AC power input to the input terminals 201A and 201B.

The inductor 21 is an example of a step-up first inductor connected to the rectifier circuit 10.

The diode 23 is an example of a first rectifying device connected between the output terminal of the inductor 21 and the output terminal 203A and having a rectification direction in the direction from the output terminal of the inductor 21 toward the output terminal 203A.

The primary winding CT1 of the current transformer and the switching device 22 are connected between the input terminal of the diode 23 and the output terminal 203B.

The primary winding CT1 of the current transformer is an example of a coil of a current transformer.

According to the first embodiment, a gallium nitride based high electron mobility transistor (GaN-HEMT) is used as the switching device 22. The HEMT formed of GaN has the characteristic of being operable at higher speed and having a smaller ON-state resistance than silicon MOSFETs.

FIG. 7B is a diagram illustrating a driver circuit of the GaN-HEMT used as the switching device 22 of the power supply unit 200 according to the first embodiment.

As illustrated in FIG. 7B, the GaN-HEMT is a three-terminal transistor having a drain, a source, and a gate. For example, electrical conduction is effected between the source and the drain (the GaN-HEMT is turned ON) if the source is grounded, a predetermined positive voltage V1 is applied between the source and the drain, and a voltage V2 applied between the source and the gate is higher than or equal to a threshold. The threshold of the voltage V2 applied between the source and the gate may be, for example, −10 V to +10 V.

Thus, the GaN-HEMT including its operations may be handled in the same manner as the MOSFET.

As illustrated in FIG. 7A, the gate of the GaN-MOSFET is connected to the control part 24, so that the control part 24 controls the gate voltage.

The diode 61 and the capacitor 62, which are connected in parallel to the switching device 22, are an example of a second rectifying device and an example of a second capacitor, respectively. The diode 61 and the capacitor 62 constitute the snubber circuit 60 for controlling surge voltage at the time of turning OFF the switching device 22 (switching the state of the switching device 22 from ON to OFF). One end of the diode 61 which serves as the input terminal of the snubber circuit 60 is connected to a connection (connecting point) A of the primary winding CT1 of the current transformer and the switching device 22. Examples of the diode 61 include a fast-recovery diode and a SiC Schottky diode.

Here, a maximum voltage value permissible as a surge voltage is determined as $V_{MAX}$. Further, letting the capacitance of the capacitor 62, the total (combined) inductance of the primary winding CT1 of the current transformer and the parasitic inductors LP1 and LP2 (FIG. 4) of the switching device 22, and the maximum value of current flowing through the primary winding CT1 of the current transformer when the switching device 22 is ON be C, L, and I, respectively, the capacitance of the capacitor 62 may be expressed by the following Eq. (1):

$$C = (1/2) \times L \times I^2 / V_{MAX}. \quad (1)$$

Therefore, in the power supply unit 200 according to the first embodiment, it is possible to effectively control surge voltage if the capacitance of the capacitor 62 of the snubber circuit 60 is set to be higher than or equal to the value expressed by Eq. (1).

As the inductance L in Eq. (1), it is also possible to use only the value of the inductance of the primary winding CT1 of the current transformer.

A first end of the inductor 202 is connected to a connection (connecting point) B of the diode 61 and the capacitor 62. The inductor 202 is an example of a second inductor. A second end of the inductor 202 is connected to the output terminal 203A.

The inductance of the inductor 202 is desirably higher than the inductance of the primary winding CT1 of the current transformer or the total (combined) inductance of the primary winding CT1 of the current transformer and the parasitic inductors LP1 and LP2 of the switching device 22, in order to prevent current released by the self-induction of the primary winding CT1 of the current transformer and the parasitic inductors LP1 and LP2 of the switching device 22 at the time of switching the state of the switching device 22 from ON to OFF from flowing through the inductor 202 and to regenerate the released current to the capacitor 62 as electric energy.

The inductance of the parasitic inductors LP1 and LP2 of the switching device 22 may be determined by analyzing the switching device 22 by, for example, conducting an electromagnetic field analysis using a finite element method, a finite-difference time-domain method, etc. Further, the inductance of the parasitic inductors LP1 and LP2 may be actually measured based on the operating characteristics of the switching device 22.

The load circuit 50 corresponds to, for example, the main board 110, the hard disk drive, 120, or the LAN modem 130 illustrated in FIG. 6.

The DC-DC converter 40 may be, for example, a forward DC-DC converter or a full-bridge DC-DC converter. Here, a description is given, with reference to FIG. 8, of a forward DC-DC converter.

Figure 8:
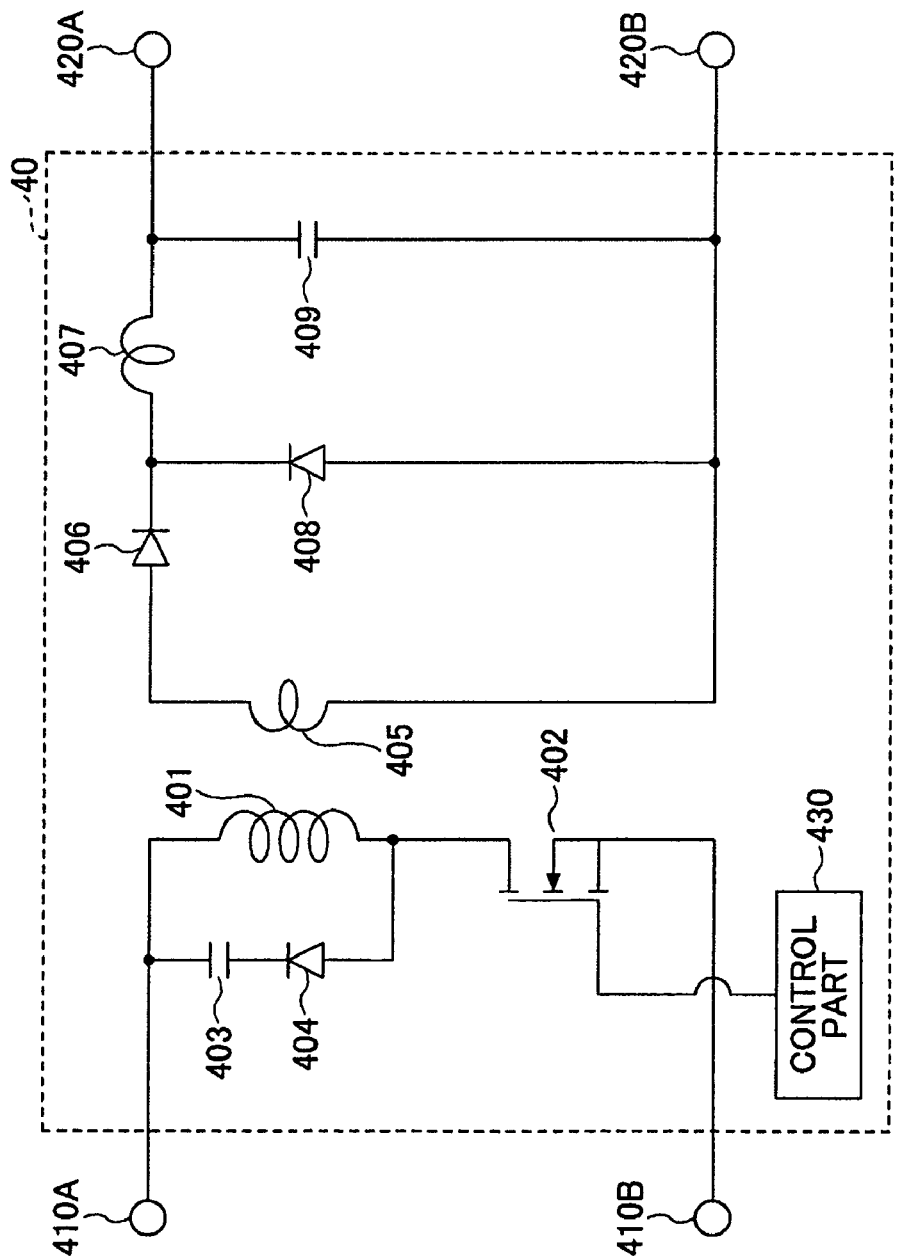
FIG. 8 is a diagram illustrating a DC-DC converter of the power supply unit according to the first embodiment.

FIG. 8 is a diagram illustrating the DC-DC converter 40 of the power supply unit 200 according to the first embodiment.

The DC-DC converter 40 includes a primary winding 401 of a transformer, a switching device 402, a capacitor 403, a diode 404, input terminals 410A and 410B, a secondary winding 405 of the transformer, a diode 406, an inductor 407, a diode 408, a smoothing capacitor 409, output terminals 420A and 420B, and a control part 430.

The primary winding 401 and the switching device 402 are connected in series between the input terminals 410A and 410B. The capacitor 403 and the diode 404 are connected in parallel to the primary winding 401. The diode 404 is so connected as to have a rectification direction in the direction from the input terminal 410B toward the input terminal 410A in order to prevent current backflow. The input terminals 410A and 410B are connected to the output terminals 203A and 203B, respectively, of the power supply unit 200 (FIG. 7A).

The secondary winding 405, the diode 406, and the inductor 407 are connected in series between the output terminals 420A and 420B. The diode 408 is so connected in parallel to the secondary winding 405 and the diode 406 as to have a rectification direction in the direction from the output terminal 420B toward the output terminal 420A in order to prevent current backflow. The capacitor 409 is connected between the output terminals 420A and 420B.

In this DC-DC converter 40, when the switching device 402 is repeatedly turned ON and OFF by controlling the gate voltage with the control part 430 connected to the gate of the switching device 402, magnetic flux created in the primary winding 401 passes through the secondary winding 405.

As a result, the voltage of the DC power input to the input terminals 410A and 4108 is converted into a predetermined voltage to be output from the output terminals 420A and 420B.

According to the first embodiment, for example, the DC power of a voltage of 385 V input to the input terminals 410A and 410B is converted into DC power of 12 V, and is output from the output terminals 420A and 420B. The voltage transformation ratio is determined by the ratio of the number of turns in the secondary winding (coil) 405 to the number of turns in the primary winding (coil) 401.

Figure 9:
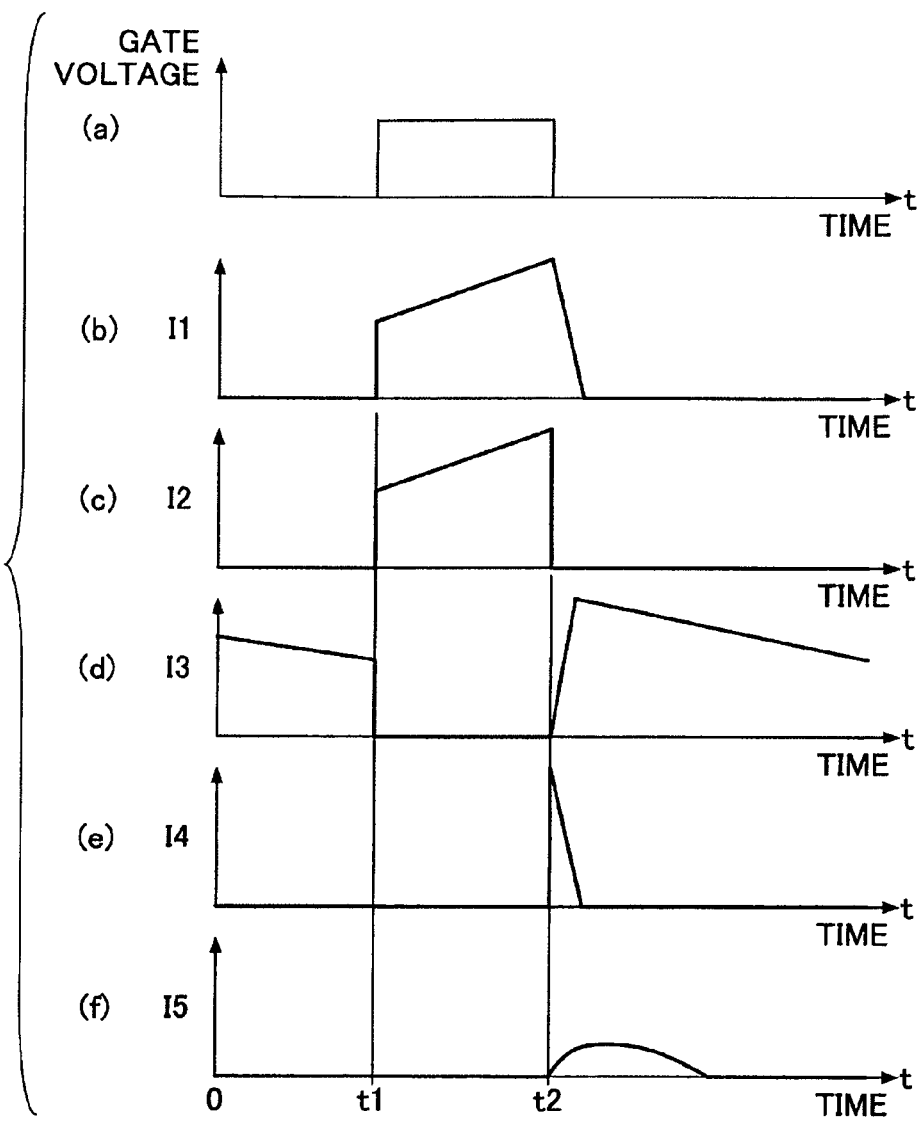
FIG. 9 is a timing chart illustrating an operation of the power supply unit according to the first embodiment.

Next, a description is given, with reference to FIG. 9, of an operation of the power supply unit 200 according to the first embodiment.

FIG. 9 is a timing chart illustrating an operation of the power supply unit 200 according to the first embodiment.

In FIG. 9, (a) illustrates the gate voltage of the switching device 22, (b) illustrates an electric current I1 flowing through the primary winding CT1 of the current transformer, (c) illustrates an electric current I2 flowing through the switching device 22, (d) illustrates an electric current I3 flowing through the diode 23, (e) illustrates an electric current I4 flowing from the diode 61 to the capacitor 62, and (f) illustrates an electric current I5 flowing from the capacitor 62 to the inductor 202. (See also FIG. 7A for the electric currents I1 through I5.)

As illustrated in FIG. 9, when the switching device 22 is turned ON at Time t1, electric current flows from the inductor 21 to the switching device 22 through the primary winding CT1 of the current transformer. Accordingly, the electric currents I1 and I2 flow.

During the ON-state of the switching device 22, current flowing through the primary winding CT of the current transformer does not flow into the diode 61, and flows entirely to the switching device 22. This is because the capacitor 62 and the inductor 202 are connected to the diode 61 on its output side to make it easier for current to flow to the ON-state switching device 22, which is lower in resistance.

Therefore, while the switching device 22 is ON, the value of the electric current I1 flowing through the primary winding CT1 of the current transformer and the value of the electric current I2 flowing through the switching device 22 are equal.

When the switching device 22 is turned OFF at Time t2, the electric current I2 flowing through the switching device 22 becomes zero amperes (0 A).

At this point, the primary winding CT1 of the current transformer outputs electric current by self-induction. Accordingly, electric current flows from the primary winding CT1 of the current transformer to the capacitor 62 through the diode 61. Therefore, the electric currents I1 and I4 flow immediately after Time t2, and as the primary winding CT1 of the current transformer releases magnetic energy due to its self-induction, the values of the electric currents I1 and I4 approach zero amperes (0 A).

The electric energy stored in the capacitor 62 with the electric current I4 is released through the inductor 202 as electric current, which is regenerated to (stored in) the smoothing capacitor 30 as electric energy.

Therefore, the electric current I5 flowing through the inductor 202 starts flowing after Time t2, at which the switching device 22 is turned OFF.

The electric current I3 flowing through the diode 23 starts flowing after Time t2, at which the switching device 22 is turned OFF. Accordingly, as illustrated in (d) of FIG. 9, after rising with a slope reverse to that of the electric current I4, the electric current I3 flows in a gradually decreasing manner with a decrease in the magnetic energy of the inductor 21. The electric current I3 flowing through the diode 23 has such a waveform as is a reversal of the waveform of the electric current I1 flowing through the primary winding CT1 of the current transformer.

Thus, according to the power supply unit 200 of the first embodiment, after switching the switching device 22 from ON to OFF, magnetic energy remaining in the primary winding CT1 of the current transformer is stored as electric energy in the capacitor 62 in the snubber circuit 60.

Thereafter, the electric energy of the capacitor 62 may be regenerated to (released and collected into) the smoothing capacitor 30 through the inductor 202.

Further, the above-described control of surge voltage and regeneration of energy may be achieved with respect to not only the magnetic energy stored in the primary winding CT1 of the current transformer but also the magnetic energy stored in the parasitic inductors LP1 and LP2 (FIG. 4) of the switching device 22 in the same manner.

That is, when the switching device 22 is switched from ON to OFF, magnetic energy remains in the parasitic inductors LP1 and LP2 in the switching device 22. The magnetic energy in the parasitic inductors LP1 and LP2 in the switching device 22 is released as electric current, and is stored as electric energy in the capacitor 62 through the diode 61 of the snubber circuit 60. Thereafter, the electric energy of the capacitor 62 is regenerated to the smoothing capacitor 30 through the inductor 202.

Therefore, according to the power supply unit 200 of the first embodiment, it is possible to achieve control of surge voltage and highly efficient regeneration of energy with respect to the magnetic energy stored in the parasitic inductors LP1 and LP2 in the switching device 22 as well as the magnetic energy stored in the primary winding CT1 of the current transformer.

Figure 10:
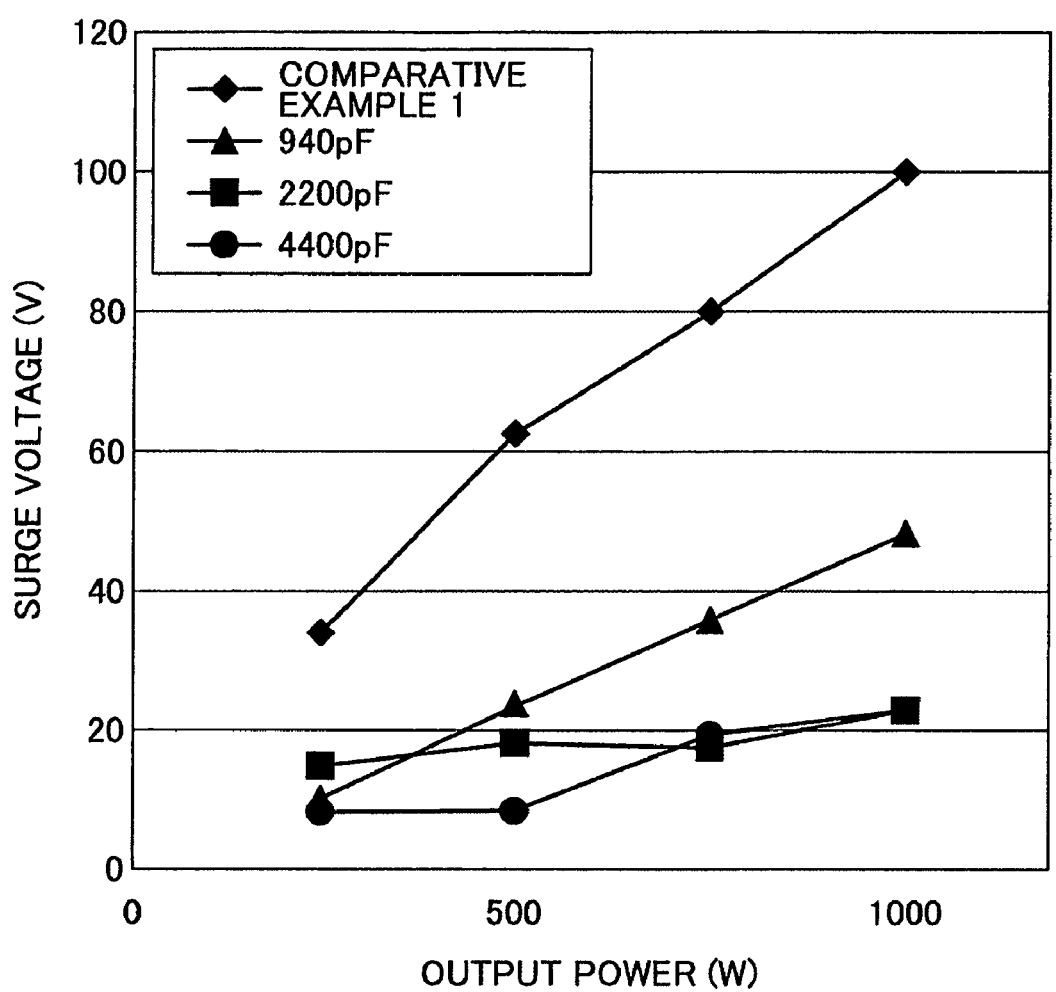
FIG. 10 is a characteristic diagram illustrating surge voltage relative to output power in the power supply unit according to the first embodiment and the power supply unit of Comparative Example 1.

Here, a description is given, with reference to FIG. 10, of a surge voltage control effect in the power supply unit 200 according to the first embodiment.

FIG. 10 is a characteristic diagram illustrating surge voltage relative to output power in the power supply unit 200 of the first embodiment and the power supply unit of Comparative Example 1. The output power represents a power value obtained by multiplying an output voltage at the output terminals 203A and 203B by a current value at the output terminal 203A.

FIG. 10 illustrates the characteristic of the power supply unit 200 of the first embodiment and the characteristic of the power supply unit of Comparative Example 1.

With respect to the characteristic of the power supply unit 200 of the first embodiment, the characteristics of three kinds of power supply units 200 different in capacitance are measured. The capacitor 62 varies to be 940 pF, 2200 pF, and 4400 pF in capacitance.

As illustrated in FIG. 10, the surge voltage tends to increase as the output power increases, and the power supply unit of Comparative Example 1 presents the highest surge voltage. In the power supply unit of Comparative Example 1, the surge voltage is approximately 35 V at an output voltage of 250 W and is approximately 100 V at an output voltage of 1000 W.

On the other hand, in the power supply unit 200 where the capacitance of the capacitor 62 is 940 pF, the surge voltage is approximately 10 V at an output voltage of 250 W and is approximately 47 V at an output voltage of 1000 W. Further, in the power supply unit 200 where the capacitance of the capacitor 62 is 2200 pF, the surge voltage is approximately 15 V at an output voltage of 250 W and is approximately 23 V at an output voltage of 1000 W. Further, in the power supply unit 200 where the capacitance of the capacitor 62 is 4400 pF, the surge voltage is approximately 8 V at an output voltage of 250 W and is approximately 23 V at an output voltage of 1000 W.

Thus, it has been found that the power supply unit 200 of the first embodiment including the inductor 202 makes it possible to substantially reduce surge voltage compared with the power supply unit of Comparative Example 1.

Further, it has been found that an increase in the capacitance of the capacitor 62 tends to reduce surge voltage.

Further, according to the power supply unit 200 of the first embodiment, by causing the inductance of the inductor 202 to be higher than the total (combined) inductance of the primary winding CT1 of the current transformer and the parasitic inductors LP1 and LP2 of the switching device 22, it is possible to efficiently regenerate magnetic energy remaining in the primary winding CT1 to the capacitor 62 as electric energy.

If the inductance of the inductor 202 is lower than or equal to the total (combined) inductance of the primary winding CT1 of the current transformer and the parasitic inductors LP1 and LP2 of the switching device 22, electric current may flow from the primary winding CT1 to the inductor 202 after turning OFF the switching device 22. A flow of such electric current may cause noise in the output voltage of the power supply unit 200 or cause resonance in the primary winding CT1 of the current transformer, the parasitic inductors LP1 and LP2 of the switching device 22, the capacitor 62, and the inductor 202.

It is also possible to control the above-described noise or resonance by causing the inductance of the inductor 202 to be higher than the total (combined) inductance of the primary winding CT1 of the current transformer and the parasitic inductors LP1 and LP2 of the switching device 22. Further, it is possible to efficiently regenerate the total (combined) magnetic energy of the primary winding CT1 of the current transformer and the parasitic inductors LP1 and LP2 of the switching device 22 through the capacitor 62 and the inductor 202.

Thus, according to the power supply unit 200 of the first embodiment, it is possible to control surge voltage in the primary winding CT1 of the current transformer and the parasitic inductors LP1 and LP2 of the switching device 22 at the time of switching the state of the switching device 22 from ON to OFF, and to efficiently regenerate electric energy stored in the capacitor 62 in the snubber circuit 60.

Further, in the power supply unit 200 according to the first embodiment, the single diode 61 is connected between the connection A and the capacitor 62. Further, no diode is connected between the connection B and the terminal of the smoothing capacitor 30 on the output terminal 203A side.

Accordingly, it is possible to store the magnetic energy of the primary winding CT1 of the current transformer in the capacitor 62 as electric energy with extremely low loss of energy.

Further, it is possible to regenerate the electric energy of the capacitor 62 to the smoothing capacitor 30 with extremely low loss of energy.

Therefore, according to the power supply unit 200 of the first embodiment, it is possible to provide a power supply unit and an information processor that enable control of surge voltage and efficient regeneration of electric energy stored in the capacitor 62 in the snubber circuit 60 with a simple circuit configuration.

In the power supply unit 200 of the first embodiment, since it is possible to control surge voltage as described above, there is no need to increase the withstand voltage of the switching device 22 in order to control surge voltage. Therefore, it is possible to reduce the ON-state resistance of the switching device 22 and also to avoid an increase in the size of the switching device 22.

The above description is given of the case where the primary winding CT1 of the current transformer is connected to the switching device 22 in order to measure the current value of the switching device 22, while the current value of the switching device 22 may also be measured using a resistor in place of the current transformer.

Figure 11A:
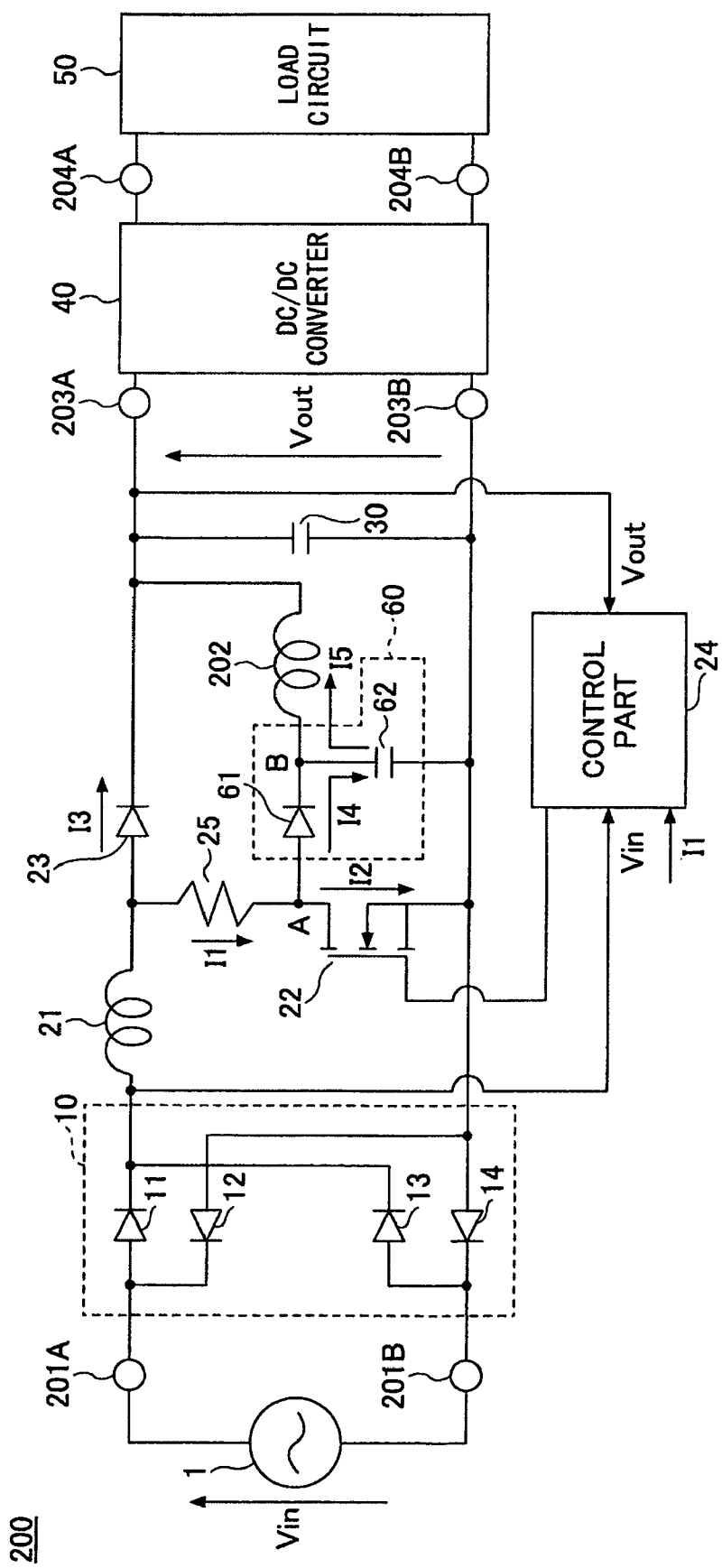
FIGS. 11A and 11B are circuit diagrams illustrating a configuration of the power supply unit according to a variation of the first embodiment.
Figure 11B:
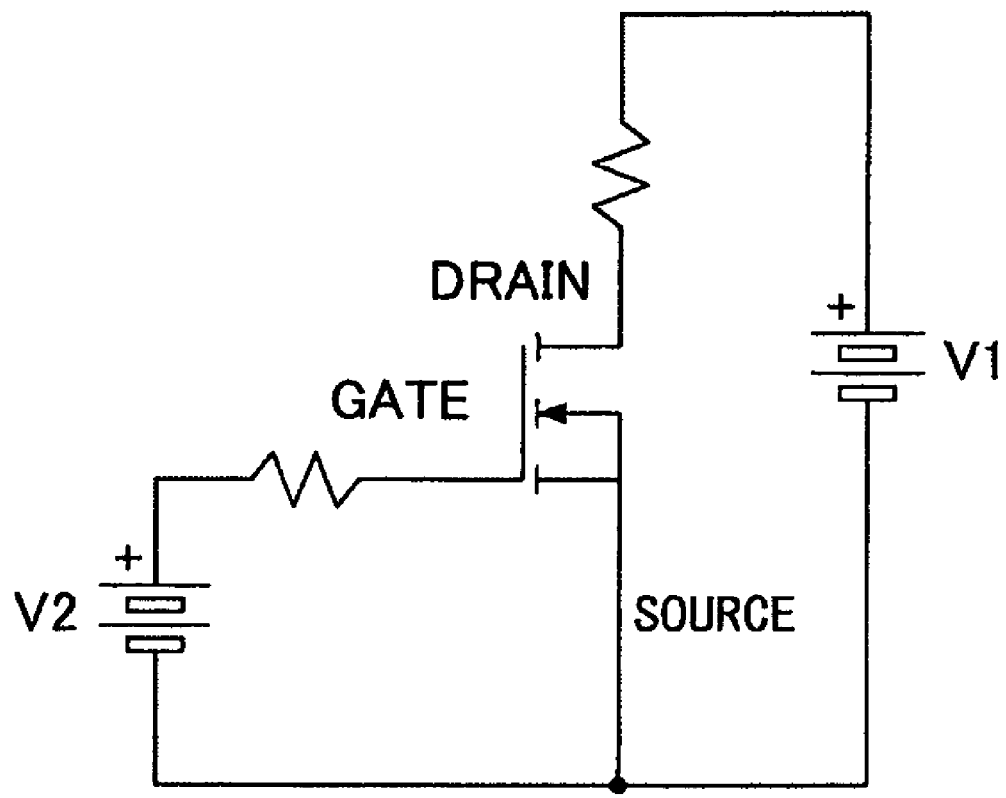

FIGS. 11A and 11B are circuit diagrams illustrating a configuration of the power supply unit 200 according to a variation of the first embodiment.

Referring to FIG. 11A, the power supply unit 200 according to the variation of the first embodiment includes a resistor 25 for current detection in place of the primary winding CT1 of the current transformer. FIG. 11B is a diagram illustrating a driver circuit of the switching device 22 of the power supply unit 200 according to the variation of the first embodiment.

In the case of thus using the resistor 25 for current detection in place of the primary winding CT1 of the current transformer as well, a surge voltage is generated with the switching of the switching device 22 because of the parasitic inductors LP1 and LP2 (FIG. 4) of the switching device 22.

Therefore, by using the inductor 202 as illustrated in FIG. 11A, it is possible to provide a power supply unit that enables control of surge voltage and efficient regeneration of electric energy stored in the capacitor 62 in the snubber circuit 60 with a simple circuit configuration.

[b] Second Embodiment

A power supply unit according to a second embodiment is different from the power supply unit 200 of the first embodiment in that the switching device 22, the snubber circuit 60, and the inductor 202 are modularized on the same substrate. Otherwise, the power supply unit according to the second embodiment is the same as the power supply unit 200 of the first embodiment. Accordingly, the same elements as or elements similar to those of the power supply unit 200 of the first embodiment are referred to by the same reference numerals, and a description thereof is omitted.

Figure 12A:
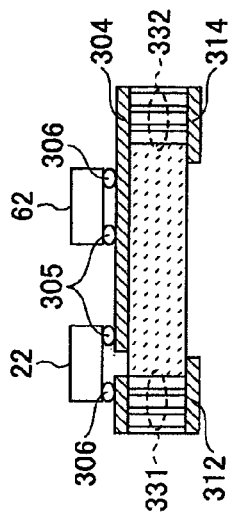
FIGS. 12A through 12D are diagrams illustrating how the switching device, the snubber circuit, and an inductor are mounted, where
Figure 12B:
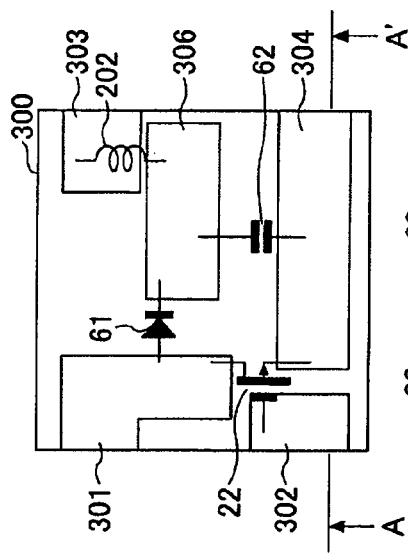
Figure 12C:
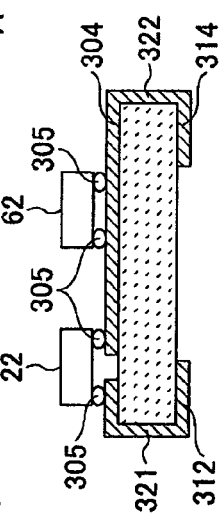
Figure 12D:
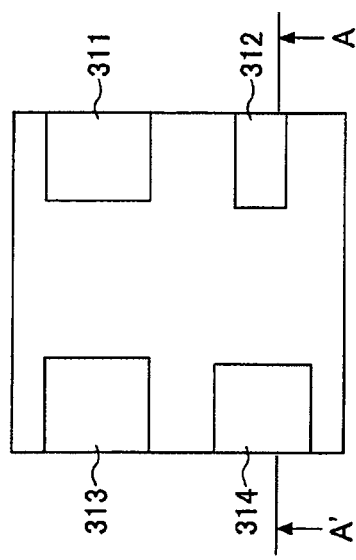

FIGS. 12A through 12D are diagrams illustrating how the switching device 22, the snubber circuit 60, and the inductor 202 are mounted. FIGS. 12A, 12B, and 12C are a plan view, a cross-sectional view taken along the line A-A' of FIG. 12A, and a bottom view, respectively, of part of the power supply unit 200 according to the second embodiment. FIG. 12B illustrates a cross section viewed in the direction of arrows A and A' in FIG. 12A. FIG. 12D is a cross-sectional view of part of the power supply unit 200 according to a variation of the second embodiment.

For a substrate 300 illustrated in FIGS. 12A through 12C, for example, a glass epoxy substrate of an FR-4 (Flame Retardant Type 4) base material to which copper foil is laminated may be used.

As illustrated in FIG. 12A, the substrate 300 has copper foil patterns 301, 302, 303, and 304 on its top surface. Further, an interconnection (wiring) pattern is formed on the substrate 300.

The switching device 22, the diode 61 and the capacitor 62 included in the snubber circuit 60, and the inductor 202 are fixed to the copper foil patterns 301, 302, 303, and 304 with, for example, gold-ball bumps 305 (FIG. 12B).

According to the second embodiment, the modularization of the switching device 22, the snubber circuit 60, and the inductor 202 is to mount the switching device 22, the snubber circuit 60, and the inductor 202 on interconnects (copper foil patterns) formed on the same substrate (substrate 300) using bumps or the like as described above.

In FIG. 12A, interconnects interconnecting the switching device 22, the diode 61, the capacitor 62, and the inductor 202 are omitted. The switching device 22, the diode 61, the capacitor 62, and the inductor 202 may be interconnected, for example, by flip-chip bonding or with bonding wires as illustrated in FIG. 7A.

As illustrated in FIG. 12C, the substrate 300 has copper foil patterns 311, 312, 313, and 314 on its bottom surface as well. The copper foil patterns 311, 312, 313, and 314 may be used as, for example, electrodes for connecting the switching device 22, the diode 61, the capacitor 62, and the inductor 202 to circuit elements around the power supply unit 200.

The copper foil patterns 301, 302, 303, and 304 on the top side illustrated in FIG. 12A and the copper foil patterns 311, 312, 313, and 314 on the bottom side illustrated in FIG. 12C may be connected using copper foil patterns 321 and 322 formed on side surfaces of the substrate 300 as illustrated in FIG. 12B.

Further, the copper foil patterns 301, 302, 303, and 304 on the top side illustrated in FIG. 12A and the copper foil patterns 311, 312, 313, and 314 on the bottom side illustrated in FIG. 12C may also be connected using vias 331 and 332 as illustrated in FIG. 12D.

Thus, according to the power supply unit 200 of the second embodiment, the switching device 22, the diode 61, the capacitor 62, and the inductor 202 are modularized. The modularization allows connecting parts for connecting the switching device 22, the diode 61, the capacitor 62, and the inductor 202 to the copper foil patterns 301 through 304 to be equal in length using the bumps 305. Accordingly, it is possible to reduce parasitic inductance at the connecting parts (bumps 305).

Further, if it is possible to reduce parasitic inductance by modularizing the switching device 22, the diode 61, the capacitor 62, and the inductor 202, it is possible to reduce the capacitance of the capacitor 62 and the inductance of the inductor 202. This makes it possible to further reduce the size of the power supply unit 200.

The thickness of the copper foil patterns 301 through 304 and 311 through 304 may be determined in view of the skin effect as follows.

A thickness d that generates the skin effect may be determined by:

$$d = \{2/(\omega \times \mu \times \rho)\}^{1/2}, \quad (2)$$

where $\omega$ is an angular frequency, $\mu$ is the magnetic permeability of a conductor (copper), and $\rho$ is the electrical conductivity of a conductor (copper).

For example, in the case of switching the switching device 22 at 10 MHz, if ω=2π×10×10⁶ (rad/s), μ=μ₀×0.999991, and ρ=5.76×10⁷ (S/m), d is determined as d≈21 μm. Here, μ₀ is the magnetic permeability of a vacuum, which is 4π×10⁻⁷.

Accordingly, for example, in the case of switching the switching device 22 at 10 MHz, it is possible to reduce the resistance of the copper foil patterns 301 through 304 and 311 through 314 by causing the thickness of the copper foil patterns 301 through 304 and 311 through 314 to be more than or equal to 21 μm.

Reduction in the resistance of the copper foil patterns 301 through 304 and 311 through 314 makes it possible to reduce the resistances between the switching device 22, the diode 61, the capacitor 62, and the inductor 202, so that it is possible to reduce power loss between the switching device 22, the diode 61, the capacitor 62, and the inductor 202 at the time of switching the switching device 22.

Further, in the power supply unit 200 according to the second embodiment, the equivalent series inductance $L_{ESL}$ of the switching device 22, the diode 61, and the capacitor 62 may be determined in the following manner.

The equivalent series inductance $L_{ESL}$ of the switching device 22, the diode 61, and the capacitor 62 is expressed by:

$$L_{ESL}=Vinp^2/(Pout \times fsw), \quad (3)$$

where Vinp is the peak value of the input voltage of the rectifier circuit 10, Pout is an output from the output terminals 203A and 203B, and fsw is the switching frequency of the switching device 22.

By way of example, the equivalent series inductance $L_{ESL}$ in the case of using a GaN-HEMT as the switching device 22 is determined.

It is assumed that the input voltage Vin of the rectifier circuit 10 is 100 V, the output Pout of the output terminals 203A and 203B is 1 kW, and the switching frequency fsw of the switching device 22 is 10 MHz.

Since the input voltage Vin of the rectifier circuit 10 is 100 V and the output Pout of the output terminals 203A and 203B is 1 kW, the peak value of the electric current of the switching device 22 is 14.4 A, and the peak value of the voltage of the switching device 22 is 144 V.

At this time, it is desired to sufficiently reduce the equivalent series inductance $L_{ESL}$ to allow an electric current of up to 14.4 A to flow from the switching device 22 through the diode 61 to the capacitor 62.

The value of the equivalent series inductance $L_{ESL}$ is determined in the following manner using Eq. (3).

That is, $L_{ESL}$=(144 V)²/(144 V×14.4 A×10 MHz)=1 μH.

By determining the equivalent series inductance $L_{ESL}$ as described above (for example, $L_{ESL}$ is 1 μH or less), it is possible to reduce the effect of parasitic components in the high-speed switching of the order of 10 MHz achieved by using a GaN-HEMT as the switching device 22.

[c] Third Embodiment

A power supply unit according to a third embodiment is different from the power supply unit 200 of the first embodiment in using a saturable reactor for the inductor 202. Otherwise, the power supply unit according to the third embodiment has the same configuration as the power supply unit 200 of the first embodiment. Accordingly, the same elements as or elements equivalent to those of the power supply unit 200 of the first embodiment are referred to by the same reference numerals, and a description thereof is omitted.

For example, if the resistance value of the load circuit 50 is relatively large, the electric energy regenerated from the inductor 202 to the smoothing capacitor 30 may be returned without being consumed by the load circuit 50.

In this case, for example, resonance may be caused in an LC circuit of the inductor 21, the capacitor 62, and the inductor 202.

The power supply unit 200 according to the third embodiment uses a saturable reactor for the inductor 202 for early attenuation of such resonance in the case of its occurrence.

The saturation current value of the saturable reactor may be determined, for example, in the following manner.

First, a peak value of current (a peak current value) in the inductor 202 is determined.

Letting the inductance of the inductor 202, the voltage across the capacitor 62, and the voltage across the smoothing capacitor 30 be L, $V_{C2}$, and $V_{C1}$, respectively, a peak value of current (peak current value) IP flowing through the inductor 202 at this point is expressed by:

$$IP=(1/L) \times (V_{C2}-Vout) \times T \times \text{Duty}, \quad (4)$$

where T is the period of the switching of the switching device 22, $V_{C2}$ is a voltage obtained by adding the output voltage Vout to the maximum voltage value $V_{MAX}$ permissible as a surge voltage, and Duty is a duty ratio in switching (ON/OFF) the switching device 22.

The duty ratio Duty is expressed by:

$$\text{Duty}=1-Vin/Vout. \quad (5)$$

The resonance energy of the capacitor 62, the inductor 202, and the smoothing capacitor 30 increases in proportion to the peak current value IP.

Here, causing the saturation current value of the inductor 202 to be smaller than the peak current value IP makes it possible to reduce resonance.

For example, using a saturable reactor whose saturation current value is one-fourth of the peak current value IP for the inductor 202 reduces the resonance energy to one-fourth. This has a noise reduction effect equivalent to connecting one stage of a common noise filter of 6 dB/oct (a filter that reduces noise to one-fourth).

Further, the power loss caused by the internal resistance of a path where resonance occurs is proportional to the square of a current value. Accordingly, using a saturable reactor whose saturation current value is one-fourth of the peak current value IP for the inductor 202 makes it possible to reduce the power loss caused by the internal resistance to one-sixteenth.

Therefore, using a saturable reactor for the inductor 202 makes it possible to reduce resonance, to reduce noise contained in the output voltage Vout, and to reduce power loss in internal resistance.

Figure 13:
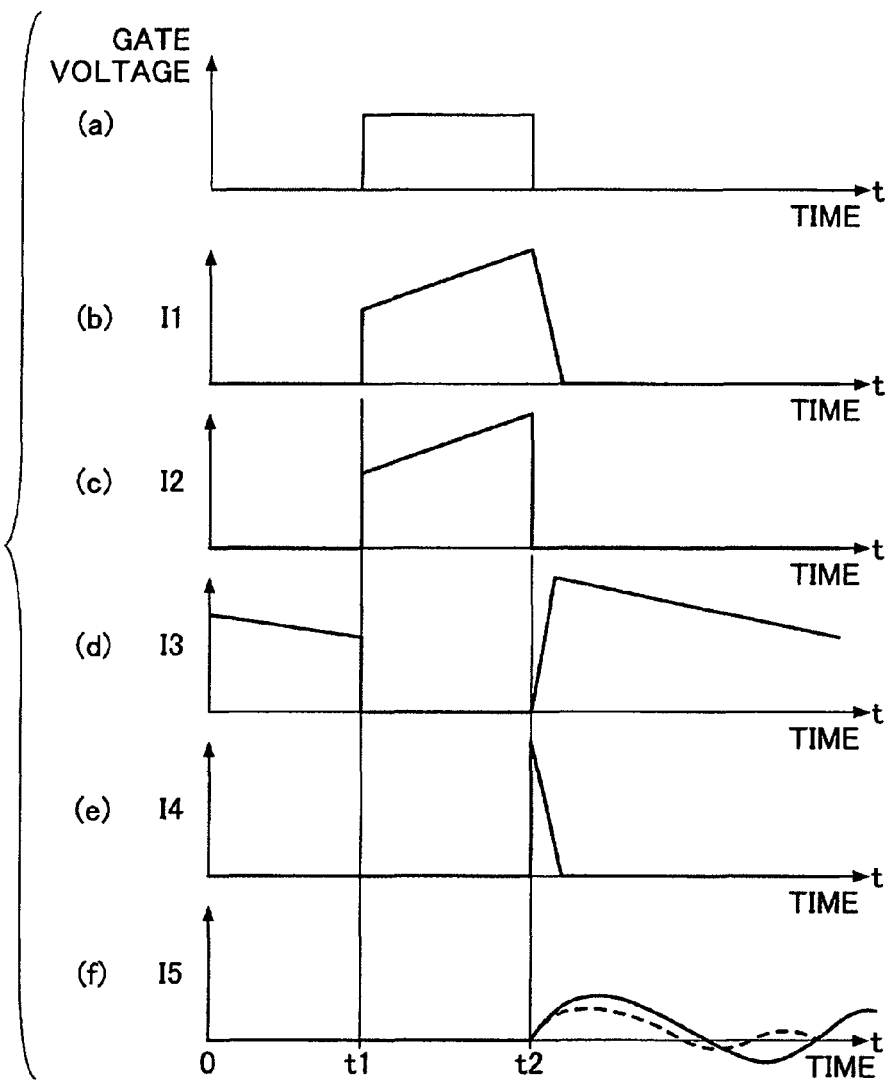
FIG. 13 is a timing chart illustrating an operation of the power supply unit according to a third embodiment.

Next, a description is given, with reference to FIG. 13, of an operation of the power supply unit 200 according to the third embodiment.

FIG. 13 is a timing chart illustrating an operation of the power supply unit 200 according to the third embodiment.

The gate voltage and the electric currents I1 through I4 illustrated in (a) through (e) of FIG. 13 have the same characteristics as those of the timing chart of FIG. 9 illustrating an operation of the power supply unit 200 according to the first embodiment.

The electric current I5 indicated by a solid line in (f) of FIG. 13 illustrates an electric current that flows through the inductor 202 when resonance is caused in the capacitor 62, the inductor 202, and the smoothing capacitor 30 in the case of not using a saturable reactor for the inductor 202.

The characteristic indicated by a broken line in (f) of FIG. 13 as the electric current I5 illustrates an electric current that flows through the inductor 202 in the power supply unit 200 according to the third embodiment, where a saturable reactor is used for the inductor 202.

It has been found that the electric current I5 (broken line) flowing through the inductor 202 in the case of using a saturable reactor for the inductor 202 attenuates earlier than the electric current I5 (solid line) in the case of not using a saturable reactor for the inductor 202 as illustrated in FIG. 13.

Thus, according to the third embodiment, by using a saturable reactor as the inductor 202, it is possible to attenuate resonance early and to provide a power supply unit that reduces resonance, noise, and power loss in internal resistance.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority or inferiority of the invention. Although the embodiments of the present invention have been described in detail, it should be understood that various changes, substitutions, and alterations could be made hereto without departing from the spirit and scope of the invention.

What is claimed is:

1. A power supply unit comprising:
  a plurality of input terminals to which alternating-current power is input;
  a positive terminal and a negative terminal for outputting direct-current power;
  a rectifier circuit configured to rectify the input alternating-current power;
  a first inductor connected to the rectifier circuit;
  a first capacitor connected between the positive terminal and the negative terminal;
  a first rectifying device connected between an output terminal of the first inductor and the positive terminal and having a rectification direction in a direction from the output terminal of the first inductor toward the positive terminal;
  a switching device connected between an input terminal of the first rectifying device and the negative terminal;
  a second rectifying device and a second capacitor connected in parallel to the switching device; and
  a second inductor connected between a connection of the second rectifying device and the second capacitor and the positive terminal.

2. The power supply unit as claimed in claim 1, further comprising:
  a current transformer having a coil connected between the input terminal of the first rectifying device and the switching device.

3. The power supply unit as claimed in claim 2, wherein the second capacitor has a capacitance satisfying a condition:

$$C \leq (1/2) \times L \times I^2 / V,$$

where C is the capacitance of the second capacitor, L is an inductance of the coil of the current transformer or a combined inductance of the coil of the current transformer and a parasitic inductor of the switching device, I is a maximum value of a current flowing through the coil of the current transformer when the switching device is ON, and V is a maximum voltage value permissible as a surge voltage.

4. The power supply unit as claimed in claim 2, wherein the second inductor has an inductance higher than an inductance of the coil of the current transformer or a combined inductance of the coil of the current transformer and a parasitic inductor of the switching device.

5. The power supply unit as claimed in claim 1, wherein the switching device, the second rectifying device, the second capacitor, and the second inductor are modularized.

6. The power supply unit as claimed in claim 5, where the switching device, the second rectifying device, and the second capacitor have an equivalent series inductance lower than or equal to 1 μH.

7. The power supply unit as claimed in claim 1, wherein the second inductor is a saturable reactor.

8. The power supply unit as claimed in claim 1, further comprising:
  a DC-DC converter connected to the positive terminal and the negative terminal.

9. An information processor, comprising:
  the power supply unit as set forth in claim 1; and
  a processing unit, a primary storage, or a secondary storage to which the power supply unit supplies direct-current power.

* * * * *

UNITED STATES PATENT AND TRADEMARK OFFICE
CERTIFICATE OF CORRECTION

PATENT NO. : 8,378,647 B2
APPLICATION NO. : 13/137939
DATED : February 19, 2013
INVENTOR(S) : Yu Yonezawa et al.

It is certified that error appears in the above-identified patent and that said Letters Patent is hereby corrected as shown below:

In the Claims:

Column 18, Line 12, In Claim 3, delete " $C \leqq (½) \times L \times I^2 / V,$ " and insert -- $C \geq (½) \times L \times I^2 / V,$ --, therefor.

Signed and Sealed this
Fourteenth Day of May, 2013

Teresa Stanek Rea
*Acting Director of the United States Patent and Trademark Office*